(12) United States Patent
Schram

(10) Patent No.: US 10,409,054 B2
(45) Date of Patent: Sep. 10, 2019

(54) METHOD OF MANUFACTURE OF AN ELECTROWETTING DEVICE

(71) Applicant: Amazon Technologies, Inc., Seattle, WA (US)

(72) Inventor: Ivar Schram, Weert (NL)

(73) Assignee: Amazon Technologies, Inc., Seattle, WA (US)

(*) Notice: Subject to any disclaimer, the term of this patent is extended or adjusted under 35 U.S.C. 154(b) by 296 days.

(21) Appl. No.: 15/473,417

(22) Filed: Mar. 29, 2017

(65) Prior Publication Data

US 2017/0205620 A1 Jul. 20, 2017

Related U.S. Application Data

(62) Division of application No. 14/320,129, filed on Jun. 30, 2014, now Pat. No. 9,612,430.

(51) Int. Cl.
*G02B 26/00* (2006.01)
*B05C 1/08* (2006.01)
(Continued)

(52) U.S. Cl.
CPC .............. *G02B 26/005* (2013.01); *B05C 1/08* (2013.01); *B32B 27/08* (2013.01); *B32B 27/281* (2013.01);
(Continued)

(58) Field of Classification Search
USPC .......................... 156/390, 391, 500, 501, 538
See application file for complete search history.

(56) References Cited

U.S. PATENT DOCUMENTS 3,908,052 A 9/1975 Sanders
4,256,383 A 3/1981 Wessel
(Continued)

FOREIGN PATENT DOCUMENTS

CN 101231349 A 7/2008
JP 2013125131 A 6/2013
(Continued)

OTHER PUBLICATIONS

Written Opinion dated Dec. 18, 2015 for PCT Application No. PCT/EP2015/064873.
(Continued)

*Primary Examiner* — Sing P Chan
(74) *Attorney, Agent, or Firm* — EIP US LLP

(57) ABSTRACT

An apparatus for manufacture of an electrowetting device is provided. The apparatus includes a first and second support plate feeding system to provide a first and second support plate respectively. The first and second support plate feeding systems include a first and second element respectively. The first and second elements are positioned relative to each other so as to angle the first support plate relative to the second support plate such that the first support plate and the second support plate are brought closer together as the first support plate and the second support plate are fed by the first element and the second element, respectively, so as to provide, during the manufacture of the electrowetting device, a cavity between the first support plate and the second support plate. The apparatus also includes a first and second fluid supply system for supply of a first and second fluid respectively.

20 Claims, 7 Drawing Sheets

(51) Int. Cl.
*B05C 9/06* (2006.01)
*B05D 1/26* (2006.01)
*B05D 1/34* (2006.01)
*B32B 27/32* (2006.01)
*B32B 27/28* (2006.01)
*B32B 27/08* (2006.01)
*B32B 27/30* (2006.01)
*B05D 1/28* (2006.01)
*B32B 27/36* (2006.01)

(52) U.S. Cl.
CPC .......... *B32B 27/304* (2013.01); *B32B 27/322* (2013.01); *B32B 27/36* (2013.01); *B32B 27/365* (2013.01); *B05C 9/06* (2013.01); *B05D 1/26* (2013.01); *B05D 1/28* (2013.01); *B05D 1/34* (2013.01); *B32B 2250/24* (2013.01); *B32B 2307/204* (2013.01); *B32B 2307/206* (2013.01); *B32B 2307/402* (2013.01); *B32B 2307/412* (2013.01); *B32B 2307/416* (2013.01); *B32B 2307/546* (2013.01); *B32B 2307/73* (2013.01); *B32B 2457/20* (2013.01); *G02B 2207/115* (2013.01)

(56) References Cited

U.S. PATENT DOCUMENTS

| | | | |
|---|---|---|---|
| 4,973,373 A | 11/1990 | Hashimoto | |
| 5,069,533 A | 12/1991 | Yuasa | |
| 5,511,591 A | 4/1996 | Abe | |
| 5,943,113 A | 8/1999 | Ichihashi | |
| 6,672,921 B1 | 1/2004 | Liang | |
| 6,831,770 B2 | 12/2004 | Liang | |
| 7,112,114 B2 | 9/2006 | Liang | |
| 7,324,264 B2 | 1/2008 | Aylward | |
| 7,522,332 B2 | 4/2009 | Liang | |
| 7,662,456 B2 | 2/2010 | Bell | |
| 7,808,603 B2 | 10/2010 | Rudin | |
| 8,282,762 B2 | 10/2012 | Liang | |
| 8,287,676 B2 | 10/2012 | Nozaki | |
| 8,582,197 B2 | 11/2013 | Liang | |
| 8,976,349 B2 | 3/2015 | Lin | |
| 9,081,250 B2 | 7/2015 | Liang | |
| 9,097,888 B2 | 8/2015 | Giraldo | |
| 9,134,528 B2 | 9/2015 | Schram | |
| 9,223,127 B2 | 12/2015 | Giraldo | |
| 9,297,998 B2 | 3/2016 | Novoselov | |
| 9,304,312 B1 | 4/2016 | Tauk | |
| 9,321,252 B2 | 4/2016 | Li | |
| 9,417,446 B2 | 8/2016 | Schram | |
| 9,423,606 B2 | 8/2016 | Schram | |
| 9,494,790 B1 | 11/2016 | Massard | |
| 9,496,919 B2 | 11/2016 | Schram | |
| 9,500,852 B1 | 11/2016 | Tauk | |
| 2003/0179437 A1 | 9/2003 | Liang | |
| 2005/0099411 A1 | 5/2005 | Van Brocklin | |
| 2006/0108065 A1 | 5/2006 | Wang | |
| 2006/0234035 A1 | 10/2006 | Wang | |
| 2011/0013255 A1 | 1/2011 | Hsieh | |
| 2012/0318454 A1* | 12/2012 | Biegler | B32B 37/04 156/308.6 |
| 2014/0168749 A1 | 6/2014 | Giraldo | |
| 2014/0211292 A1 | 7/2014 | Schram | |
| 2014/0266992 A1 | 9/2014 | Schram | |
| 2014/0285869 A1 | 9/2014 | Giraldo | |
| 2015/0277101 A1 | 10/2015 | Novoselov | |
| 2015/0378147 A1 | 12/2015 | Schram | |
| 2015/0378148 A1 | 12/2015 | Schram | |
| 2016/0077324 A1 | 3/2016 | Tauk | |
| 2016/0091709 A1 | 3/2016 | Boon | |
| 2016/0091711 A1 | 3/2016 | Tauk | |
| 2016/0109696 A1 | 4/2016 | Giraldo | |
| 2016/0178888 A1 | 6/2016 | Massard | |
| 2016/0178889 A1 | 6/2016 | Massard | |
| 2016/0178891 A1 | 6/2016 | De Greef | |
| 2016/0178892 A1 | 6/2016 | De Greef | |
| 2016/0282605 A1 | 9/2016 | Petcu | |

FOREIGN PATENT DOCUMENTS

| | | |
|---|---|---|
| JP | 201466835 A | 4/2014 |
| WO | 8502915 A1 | 7/1985 |
| WO | 9849597 A1 | 11/1998 |
| WO | 2009106546 A1 | 9/2009 |
| WO | 2013079709 A1 | 6/2013 |
| WO | 2013083820 A1 | 6/2013 |
| WO | 2014072425 A1 | 5/2014 |

OTHER PUBLICATIONS

International Search Report dated Dec. 18, 2015 for PCT Application No. PCT/EP2015/064873.

Chinese Office Action for Chinese Application No. 2015800357632 dated Jun. 29, 2018.

\* cited by examiner

METHOD OF MANUFACTURE OF AN ELECTROWETTING DEVICE

CROSS-REFERENCE TO RELATED APPLICATIONS

This is a divisional application of U.S. patent application Ser. No. 14/320,129, filed Jun. 30, 2014, the contents of which are incorporated by reference herein in their entirety.

BACKGROUND

Known methods of manufacturing an electrowetting device can require large volumes of fluid for dispensing a relatively small amount of the fluid for the finally manufactured device. This can lead to inefficiencies in manufacture, for example wasting of unused volumes of fluid which can be expensive and high rates of evaporation of fluids being dispensed.

It is desirable to provide a more efficient method of fluid dispensing for manufacture of an electrowetting device.

DETAILED DESCRIPTION

Figure 1:
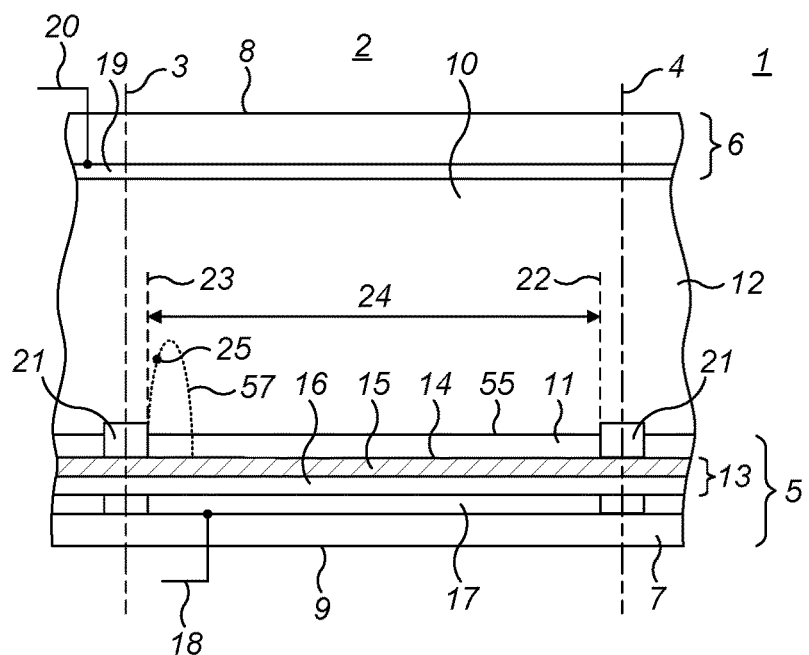
FIG. 1 shows schematically an example display element.

FIG. 1 shows a diagrammatic cross-section of part of an example of an electrowetting display device 1, including a plurality of picture elements or display elements 2, one of which is shown in the FIG. and which may also be referred to as an electrowetting cell. The lateral extent of the display element is indicated in the FIG. by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 6, 7 and may be rigid or flexible. In manufacturing examples described below the substrate is sufficiently flexible, transparent and may be formed for example of polycarbonate or polyethylene naphthalate (PEN), "polyester 12,13" or poly (ethylene terephthalate), or any other suitable material as the skilled person will appreciate.

The display device has a viewing side 8 on which an image or display formed by the display device can be viewed and a rear side 9. In the FIG. a surface of the first support plate 5, which surface is in this example a surface of the substrate 7, defines the rear side 9; a surface of the second support plate 6, which surface is in this example a surface of the substrate 6, defines the viewing side; alternatively, in other examples, a surface of the first support plate may define the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to show different colors.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus and is shown in FIG. 1 as an interface 57 with first fluid contracted with a voltage applied and as an interface 55 when a zero voltage is applied. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. The second fluid may be transparent; it may instead be colored or absorbing. The first fluid is electrically non-conductive and may for instance be an alkane like hexadecane or may be an oil such as silicone oil.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a color. In examples to be described below, the first fluid is black and therefore absorbs substantially all parts of the optical spectrum, for example in the visible light spectrum. The term "substantially absorbs" includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid. The support plate 5 includes an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in the FIG. The insulating layer has a surface 14 facing the space 10 of the display element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the FIG. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material like silicon oxide or silicon nitride or a stack of these (for example, silicon oxide-silicon nitride-silicon oxide) or an organic material like polyimide or parylene.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the FIG.

The support plate 6 includes a second electrode 19, which may extend between walls of a display element or extend uninterruptedly over a plurality of display elements 2, as shown in the FIG. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the center of the walls 21. The area of the surface 14 between the walls of a display element, indicated by the dashed lines 22 and 23, is called the display area 24, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
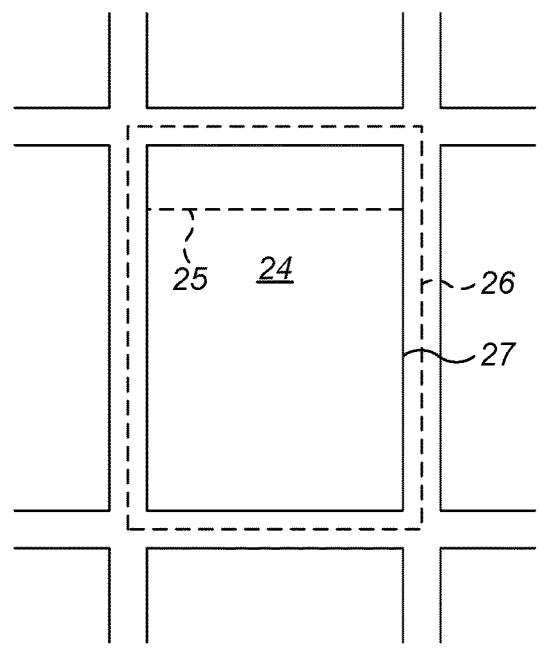
FIG. 2 shows a plan view of the example display element.

FIG. 2 shows a matrix of rectangular picture elements in a plan view of the hydrophobic surface 14 of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 23.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a color display device, the display state may also include color.

Figure 3:
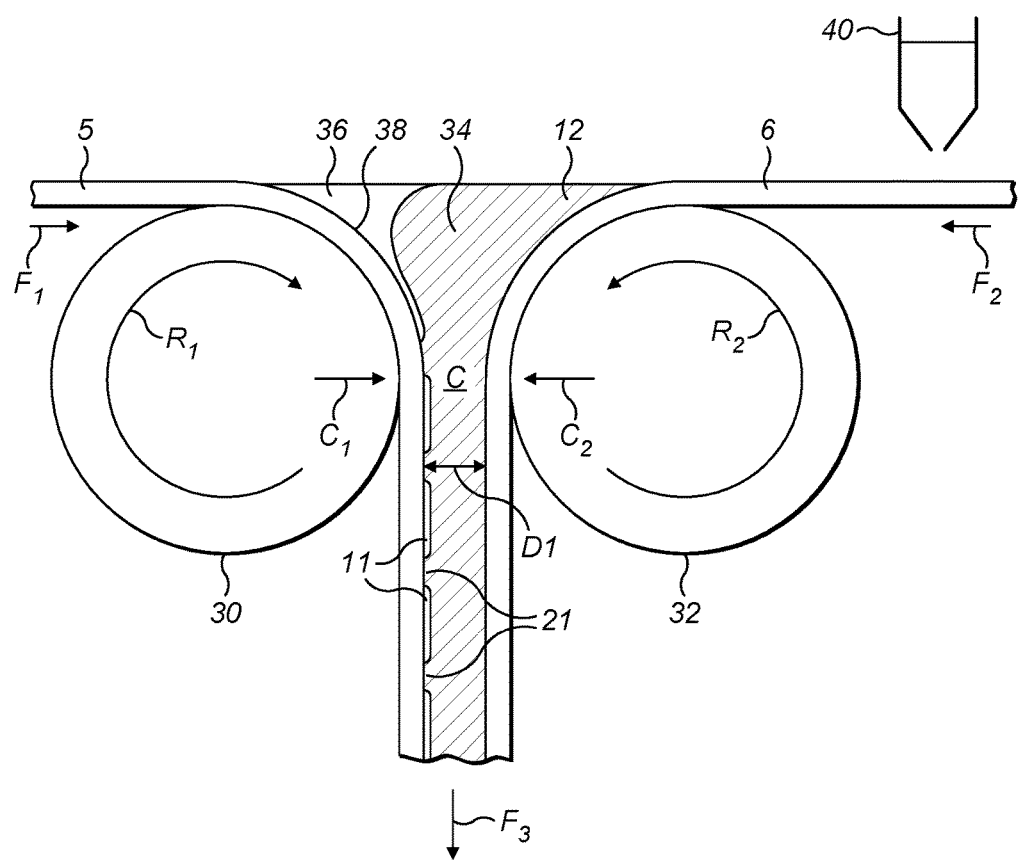
FIGS. 3 to 6 each show different examples of a part of a method of manufacturing an electrowetting device.
Figure 7:
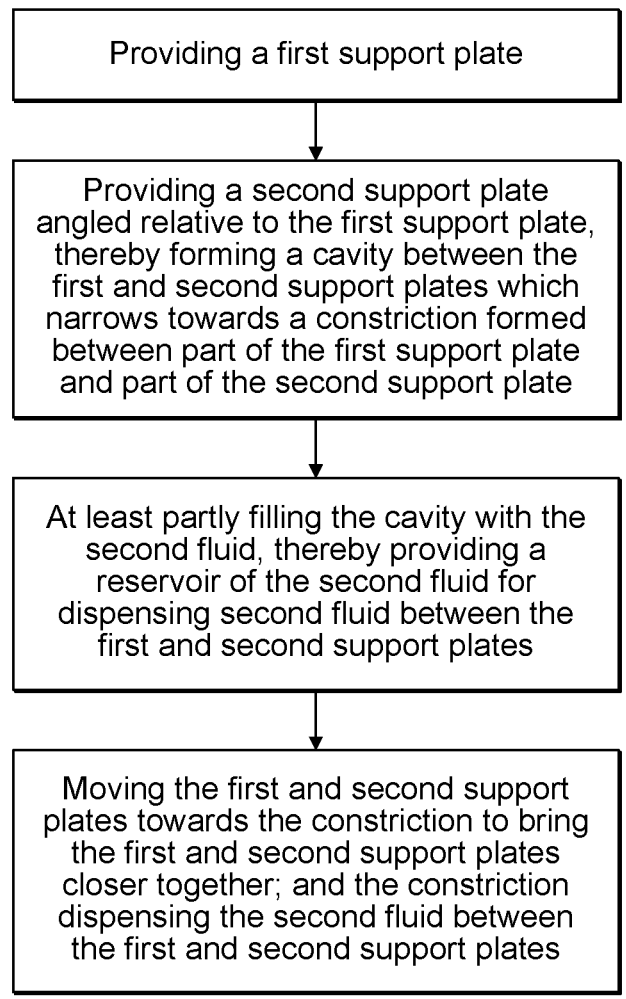
FIGS. 7 and 8 show flow diagrams of examples of a method of manufacturing an electrowetting device.

FIG. 3 shows schematically part of an example method of manufacturing an electrowetting display device. For clarity of description, apparatus used in the manufacturing process is described in conjunction with the method provided by the apparatus for manufacturing the device. However it is to be appreciated that this description includes a description of the apparatus separately, i.e. when not in use and without the presence of the materials and components of the display device being assembled to manufacture the device. FIG. 7 is a flow diagram showing parts of an example manufacturing process described herein.

Apparatus for providing a method of manufacturing an electrowetting device according to examples described herein includes a first support plate feeding system configured to provide a first support plate and a second support plate feeding system configured to provide a second support plate.

In the examples to be described, the first support plate and the second support plate for manufacturing a display device are each provided separately from each other and are at least partially pre-assembled. So, in examples described herein, the support plate fed by the first support plate feeding system may be the first support plate as described above with reference to FIG. 1 and the support plate fed by the second support plate feeding system may be the second support plate as described above with reference to FIG. 2. For clarity of illustration, in FIGS. 3 to 6 the first and second support plates are each shown schematically as a single layer, without showing separate layers forming the plates. For example, the walls of the first support plate are not illustrated, though it is to be appreciated that they are present when the first support plate is being fed through apparatus described below.

For some examples of manufacture described herein, the method may be referred to as a "roll to roll" technique involving feeding of the first and second support plates through the manufacturing process using a series of rollers. Accordingly, each of the first and second support plates to be fed through the manufacturing apparatus needs to be sufficiently flexible to be manipulated by the rollers without causing the plates damage. Thus, as explained above, the substrate in such examples is sufficiently flexible to bend around at least part of a roller, for being fed during the roll to roll technique. Such flexibility applies also to other parts of the first and second support plates, including the insulating layer, the barrier layer, the wall material and the electrode described previously, such that the first and second support plates are sufficiently flexible to co-operate with the rollers in the roll to roll technique. The flexibility of the support plate is however limited where appropriate such that a manufactured electrowetting display device is sufficiently rigid for its intended purpose; therefore in some examples the support plates may be substantially rigid but with sufficient flexibility for their use in the roll to roll technique when exposed to mechanical forces used during the roll to roll technique; in other examples, where the display device is intended to be flexible, the first and second support plates may be less rigid. In examples, the materials from which the first and second support plates are made are chemically and mechanically compatible with the rollers such that there is no slip between each of the first and second support plates and respective rollers. Each of the first and second support plates may be fed respectively from a source, for example a roll of the first support plate and a roll of the second support plate, or in other examples each of the first and second support plates may be fed from an earlier stage of the manufacturing process where the first and second support plates were at least partly manufactured. Feeding of the first and second support plates is shown in FIG. 3 by arrows F1, F2 respectively.

The first and second support plates fed by the first and second feeding systems, respectively, may each be part of a larger sheet of a plurality of first support plates and second support plates, respectively. In other words, a sheet, otherwise referred to as a foil, fed by the first support plate feeding system, may be dividable into a plurality of first support plates after assembly of the display device, for example using a "scribe and break" process known to the skilled person. This may be done similarly for the second support plate. Using such a foil gives a more efficient manufacturing process so that numerous display devices may be assembled continuously and efficiently.

In this example the first support plate feeding system includes a first roller 30 and the second support plate feeding system includes a second roller 32 although in other examples different elements may be used instead of either of the first and second rollers, for example elements with an at least partly curved surface, to position the first and second support plates relative to each other for the manufacture process to be described.

The first support plate is wrapped at least partly around the first roller, passing from a first support plate source. The second support plate is wrapped at least partly around the second roller, after passing from a second support plate source. More specifically in this example an outer surface of each of the first and second support plates is wrapped at least partly around the respective first and second rollers. The first roller and the second roller are separated from each other and positioned relatively to each other such that the first support plate and second support plate are angled relatively to each other, i.e. the second support plate is angled relative to the first support plate and vice versa, to define, i.e. form, a cavity 34 between the first and second support plates. The cavity 34 narrows towards a constriction C between the first and second support plates. In this example the constriction is formed at a region between the first and second rollers 30, 32 where the first and second rollers are closest to each other, i.e. a narrowest region of the cavity between the rollers, which may be otherwise referred to as a nip between the rollers. The constriction in this example is shown in FIG. 3 between the arrows labelled C1 and C2. In this example the cavity 34 is substantially V-shaped; in other words the cavity between the first and second support plates tapers or narrows towards the constriction. A wider part of the cavity 34 above the constriction is formed between parts of the first and second rollers which are less close together than at the constriction. Substantially V-shaped includes shapes of the cavity 34 which have substantially flat sides, i.e. in some examples where flexible first and second support plates are pulled taut whilst being fed between rollers and in other examples despite there being non-flat walls on the first support plate and in other examples which do not have flat sides, for example where sides of the cavity 34 are curved due to a curved surface of each of the first and second rollers. For example, a first angle of the first support plate relative to the second support plate may be greater at a first position with a first distance between the first and second support plates than a second angle of the first support plate relative to the second support plate at a second position, at the constriction, between the first and second support plates. The first position corresponds with a wider part of the cavity and the second position corresponds with a narrower part of the cavity. With the first angle being greater than the second angle, the first and second support plates are in examples less parallel relative to each other at the first position compared with at the second position. Indeed, at the second position, at the constriction, parts of the first and second support plates may be substantially parallel to each other, i.e. parallel within acceptable manufacturing tolerances.

For manufacturing the display device, the cavity 34 is at least partly filled with the second fluid 12 (the second fluid 12 being shown in FIG. 3 with shading). The second fluid may be provided in the cavity by a suitable second fluid supply system. The cavity 34 therefore functions as a reservoir of the second fluid for dispensing the second fluid between the first and second support plates. In other words, the cavity 34 functions as a container or funnel for the second fluid, with sides of the container or funnel being formed by the first support plate and the second support plate, from which container or funnel the second fluid may flow. This avoids the need to submerge support plates in a bath of the second fluid, as is done in known methods, to dispense the second fluid between the first and second support plates. Such known methods require considerably more second fluid than is needed to be dispensed between the first and second support plates, which can lead to inefficiencies in the manufacturing process, for example by requiring large volumes of possibly expensive fluids and leading to wasting or contamination of undispensed fluid and loss due to evaporation. In the new method of manufacture described in examples herein, using the first and second support plates to form the second fluid reservoir, so that there is no need to provide the second fluid on both sides of the first and/or second support plate for dispensing the second fluid between the first and second support plates, gives a more efficient method by for example reducing at least one of the inefficiencies described above.

It is noted that a volume of second fluid in the cavity need not be enclosed on all sides to be suitably contained to form the reservoir. In fact, in examples it is sufficient to use the first and second support plates to form the cavity; no barriers for example are required which lie in a plane parallel to the plane that FIG. 3 is drawn in. Despite this, in such examples, the second fluid is contained within the cavity due to surface tension forces of the second fluid, provided that a distance between the first and second support plates in forming the cavity does not exceed a distance at which the surface tension forces are overcome, which would cause the second fluid to spill out of the cavity. Thus, in examples, the distance between the first and second support plates may be within a capillary length property of the second fluid when interfacing with a gas surrounding an exterior of the first and second support plates. As will be explained later, the first fluid may be dispensed using a channel. In examples, due to the surface tension forces of the second fluid which keep the second fluid within the cavity, the second fluid may also form a barrier of second fluid around the volume of first fluid in the channel, thereby preventing first fluid from spilling out of the cavity.

In examples the constriction may be provided at the lowest region of the cavity 34 to assist dispensing of the second fluid between the first and second support plates using gravity. Indeed, in such examples, the weight of the second fluid above the constriction can help apply pressure at the constriction to dispense and assist flow of the second fluid through the constriction.

To manufacture the display device the first support plate is fed and therefore moved over the first roller, in this example assisted by rotating the first roller in a first rotational direction R1, which in this example is clockwise, whilst moving the first support plate over the first roller. The second support plate is fed and therefore moved over the second roller, in this example assisted by rotating the second roller in a second rotational direction R2, which in this example is opposite the first rotational direction and is therefore anti-clockwise, whilst moving the second support plate over the second roller.

Given the positioning of the first and second rollers, moving the first support plate over the first roller and moving the second support plate over the second roller, in this example by rotating the rollers in the directions described, moves the first and second support plates towards the constriction and towards each other. In other words the first and second support plates are brought towards each other at the constriction. It is to be understood that in other examples the first support plate may be considered to be moved towards the second support plate whilst moving the first and second support plates towards the constriction, or vice versa.

At the constriction the first and second support plates are brought together with, in this example, a distance D1 between the two support plates which is substantially equal to a distance between the first and second support plates of the manufactured display device, thus setting the distance between the plates. Thus, after having been fed through the constriction, the distance between the first and second support plates is also substantially equal to the distance between the first and second support plates of the manufactured display device. The phrase "substantially equal" covers variations from the distance of the manufactured display device due to for example variations within acceptable manufacturing tolerances or a contraction of a sealing material (described later) due to curing. The distance D1 in this example is taken in a direction perpendicular to a surface of the second support plate adjoined by the second fluid.

Thus, at the constriction, the second fluid is dispensed between the first and second support plates, from the reservoir of second fluid in the cavity 34, as a consequence of moving the first and second support plates towards the constriction, which brings the first and second support plates closer together, i.e. towards each other. Thus, during dispensing the first and second support plates are moved through the constriction and the second fluid is dispensed from the reservoir, through the constriction, to in-between the first and second support plates. As the second fluid is dispensed, it may in some examples be necessary to supply more of the second fluid into the cavity 34, using a suitable second fluid supply system, to maintain a supply of second fluid for dispensing at the constriction whilst continuing to feed the first and second support plates. Further, supplying more of the second fluid may be necessary to maintain a channel of the first fluid described below. In other examples, the volume of the second fluid provided in the cavity may be sufficient for dispensing the second fluid for an intended duration of dispensing the second fluid. Dispensing of the second fluid may in examples be controlled in dependence on a rate of rotating the first and second rollers; therefore an appropriate rate may be chosen to ensure a satisfactory and stable flow of the second fluid.

The first fluid is dispensed on at least one part of a surface of the first support plate. In this example, the first fluid is dispensed on the surface of the display area of each display element of the first support plate. This is illustrated in FIG. 3 as regions of the first fluid 11. It is to be appreciated that the first fluid is dispensed on the surface of further display areas of the first support plate not illustrated; these include display areas of further of the sheet to be fed to the constriction but also further display areas across an extent of the first support plate taken in a plane perpendicular to the plane of the FIG. It is to be noted that although the walls of display elements are not illustrated in FIG. 3, for clarity, they are indicated in FIG. 3 with the label 21 where there is an interruption between regions of first fluid 11.

To dispense the first fluid, the first fluid is provided in part of the cavity 34 between the first and second support plates using for example a first fluid supply system. More specifically, the first fluid is provided at least partly, in this example entirely, within a channel 36 formed between a part 38 of a surface of the first support plate and the second fluid 12. The channel may have the form of a longitudinal depression in the second fluid, a groove, a trough or a longitudinal recess. The channel of first fluid is formed due to the immiscibility of the first and second fluids and therefore an interface, i.e. meniscus, between the first and second fluids defines, i.e. determines, a form of the channel. A sufficient volume of first fluid is supplied adjacent to the first support plate, on a surface of the second fluid in the cavity 34, to form the channel of first fluid. Therefore, the channel of first fluid functions as a reservoir of first fluid for dispensing the first fluid on the surface of the first support plate. Given the hydrophobic properties of the display areas of the first support plate, the first fluid rather than the second fluid tends to wet the display areas. Thus, as the first support plate is moved towards the constriction, in this example by moving the first support plate over the first roller, the part 38 of the surface of the first support plate is moved along a side of the channel 38 and the display areas are wet by the first fluid. As the first support plate continues to be moved towards the constriction, the display areas remain coated with the first fluid, these being dispensed regions of first fluid for the manufactured display device. FIG. 3 shows a region of first fluid being formed as an extruded region of first fluid extending along the surface of the first support plate from the channel 38. As the walls are less hydrophobic than the display areas and are therefore less wettable to the first fluid than to the second fluid, being for example hydrophilic, the walls are not coated with the first fluid given the preference of the first fluid to wet the display areas. Dispensing of the first fluid, for example the thickness of the first fluid layer formed on each display area, may be controlled by controlling one or more of the following: the angle of the first support plate, a speed of moving the part 38 of the surface of the first support plate along the side of the channel, in this example the speed of feeding the first support plate over the first roller; the volume of first fluid in the channel; the volume of the second fluid in the cavity; or the properties of the first fluid such as the wettability of the first fluid for the display areas. In some examples it may be necessary to supply more of the first fluid in the channel during dispensing of the first fluid on the surface of the first support plate, using a first fluid supply system, to maintain a supply of the first fluid in the channel; in other examples the volume of first fluid in the channel may be sufficient for the intended duration of dispensing the first fluid. In examples, as the skilled person will understand, the shape of the channel may be controlled using one or more of: controlling a shape of the channel using one or more of: a position of the further surface relative to the part of the surface of the first support plate; a spacing between the further surface and the part of the surface of the first support plate, a wettability of the further surface for the first fluid, a wettability of the further surface for the second fluid, a volume of the provided second fluid, a volume of the provided first fluid, a surface tension property of the first fluid, a surface tension property of the second fluid, an extent of immiscibility of the first and second fluids, a density of the first fluid, a density of the second fluid, a shape of the interface between the first and second fluids, a shape of the further surface, or an angle of the part of the surface of the first support plate relative to the further surface.

In examples a sealing material for coupling the first support plate with the second support plate is dispensed on a surface of a part of the second support plate before that part of the second support plate reaches the constriction during moving the first and second support plates towards the constriction. Although for clarity the sealing material is not shown in FIG. 3, a sealing material dispensing system 40 for dispensing the sealing material is illustrated. The sealing material in examples is for forming a sealing element for sealing a perimeter of a display device and which therefore may be formed as a rectangular or square shaped seal for example for surrounding a matrix of display elements of the display device being manufactured. Therefore, the sealing material may be dispensed with a suitable shape and of sufficient thickness for coupling the first and second support plates at the constriction. The sealing material is dispensed in this example before the constriction and feeding the second support plate moves the sealing material towards the constriction C. At the constriction C where the first and second support plates are closest together, the first support plate is coupled with the second support plate by bringing the first support plate into contact with the sealing material dispensed on the part of the surface of the second support plate. The dispensing of the sealing material may be timed in coordination with the speed of rotating the first and second rollers and in dependence on a layout of display areas of the first support plate, including for example a sealing region (not illustrated) of the first support plate which lacks display areas and which surrounds a matrix of display areas for the display device, so that the first support plate is coupled with the second support plate at the desired location, i.e. the sealing region. The sealing material may be dispensed as a curable and mouldable compound such that, when dispensed with a thickness greater than the distance D1, the constriction applies pressure to the sealing material via the first and second support plates, thereby compressing the sealing material between the first and second support plates to ensure suitable adhesion of the sealing material to each of the first and second support plates, to provide a suitable seal for the display device. With the sealing material being curable, the sealing material may be irradiated (not illustrated) with ultraviolet light after the constriction to cure the sealing material and thereby form the sealing element. In other examples the sealing material may be a pressure sensitive adhesive.

After the sealing material has been cured to form the sealing element and with the support plates having been fed through the constriction, the assembled display device is fed in the direction F3 to be processed further, for example to divide the coupled first and second support plate sheets to form individual display devices.

Figure 4:
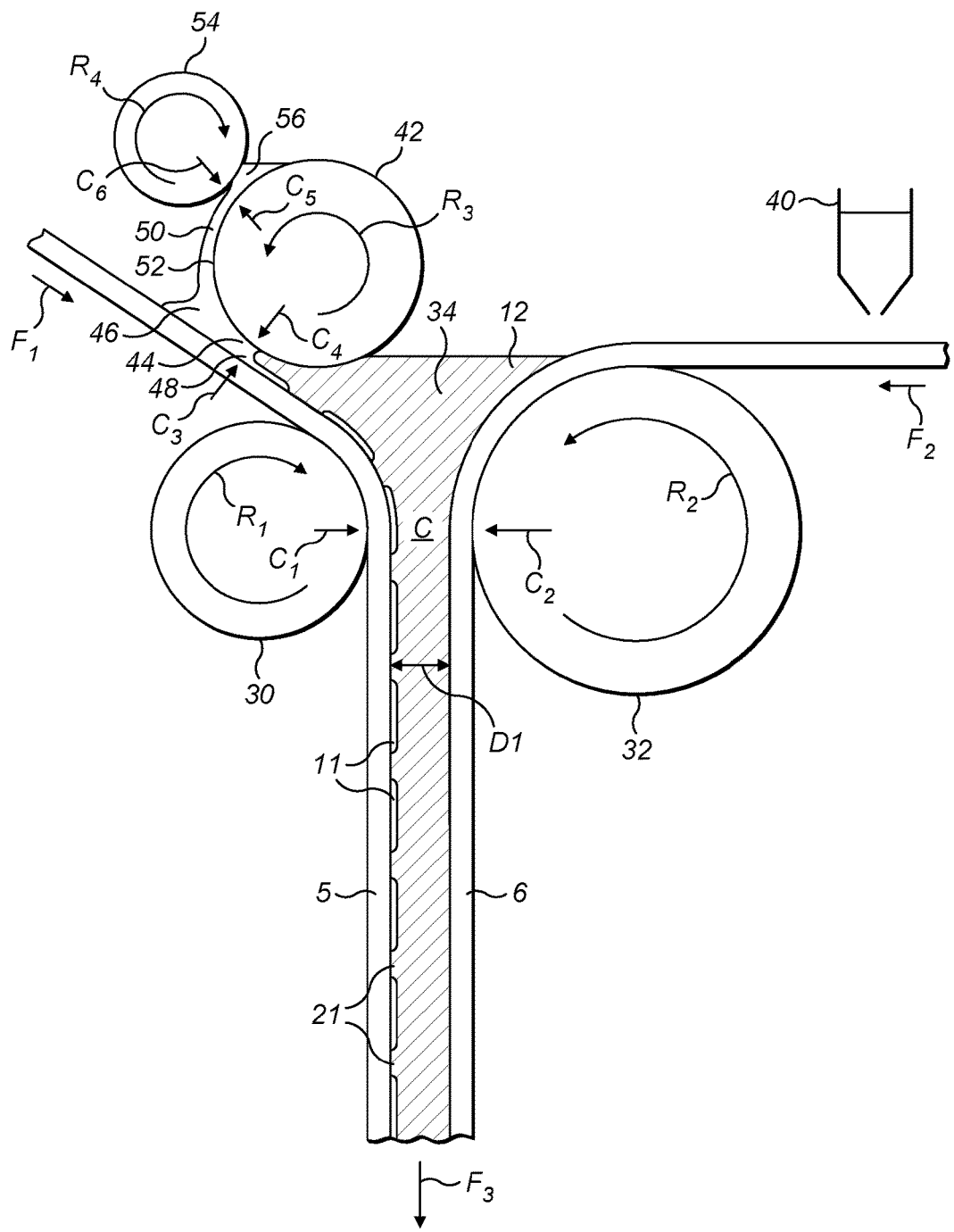

FIG. 4 illustrates a different example of part of a method of manufacturing an electrowetting display device. Features of the apparatus and their role in manufacturing the display device are similar to those described using FIG. 3 and are labelled in FIG. 4 using the same reference numbers; corresponding descriptions apply. Differences in the example of FIG. 4 compared with that of FIG. 3 will therefore be described.

In this example of FIG. 4 a dispensing of the first fluid on the display areas of the first support plate is performed differently than in FIG. 3. A further surface is provided in this example by a further element which in this example is a third roller 42 positioned relative to and spaced from the first support plate 5 to form a second constriction 44 in this example between the arrows labelled C3 and C4. The second constriction is formed between the first support plate and a surface of the third roller 42 before a first support plate is fed to the constriction C. A tension in the first support plate, between the first roller 30 and not illustrated parts of the first support plate feeding system located before the first roller, maintain a position of a part of the first support plate relative to the surface of the third roller 42, thereby defining, i.e. forming, the second constriction where the third roller is closest to a surface of the first support plate. The third roller 42 is positioned to be at least partly immersed in the second fluid in the cavity 34 between the first and second support plates. First fluid is supplied in a cavity 46 between part of the first support plate and the third roller. A channel 48 is formed between a part of the surface of the first support plate, the second fluid 12 in the cavity 34 between the first and second support plates and the surface of the third roller. As for the channel described previously, the channel 48 is formed due to the immiscibility of the first and second fluids and therefore an interface, i.e. meniscus, between the first and second fluids defines, i.e. determines, a form of the channel 48. The form of the channel is influenced too by the position of the surface of the third roller 42 and therefore by the second constriction 44. The first fluid is dispensed on the display areas of the first support plate by, and therefore at, the second constriction 44, as the first support plate is moved towards the constriction C by the first roller 30. More specifically, the part of the surface of the first support plate forming the channel 48 is moved along a side of the channel 48. The second constriction 44, specifically a size of a spacing between the further surface and the part of the surface of the first support plate, controls a thickness of the first fluid for dispensing the first fluid, the thickness in this example being taken in a direction perpendicular to the surface of the part of the first support plate at the second constriction 48. For example, the second constriction 44 reduces a thickness of the first fluid and aids spreading of the first fluid across a surface of the first support plate for being coated by the first fluid. Factors described above for controlling dispensing the first fluid with reference to FIG. 3 apply appropriately in this example too.

In this example, first fluid 50 is supplied on the surface 52 of the third roller 42 using a fourth roller 54. The fourth roller is positioned relative to the third roller to provide a third constriction 56 between the third and fourth rollers, the third constriction being indicated by the arrows C5 and C6. First fluid is provided at the third constriction 56, for example by a first fluid supply system. The third constriction controls an amount of first fluid supplied on the surface of the third roller to form a layer and therefore an amount of first fluid provided by the third roller in the channel 48 between the third roller and the first support plate. The third roller is rotated in this example in an anticlockwise rotational direction R3 to provide first fluid in the channel 48, with in this example the fourth roller being rotated in an opposite rotational direction R4, i.e. clockwise in this example, to control providing of first fluid on the third roller, i.e. transferring of first fluid from the fourth roller to the third roller surface. The third roller may be rotated during the moving the part of the surface of the first support plate along the side of the channel A speed of rotating the third roller, relative to the speed of the moving the part of the surface of the first support plate along the side of the channel, in examples controls a rate of dispensing the first fluid on the part of the surface of the first support plate.

In this example of FIG. 4 the second roller 32 performs the function of the second roller described using FIG. 3 but has a larger diameter than the first roller in this example, to form a deeper cavity 34. Thus the cavity 34, when filled with second fluid 12, immerses part of the third roller, for forming the channel 48.

Although walls of the first support plate are not illustrated, it is to be appreciated that the second constriction 44 is sized such that the walls of the first support plate may be fed through the second constriction 44 without damage. The third roller may therefore be positioned so as not to contact the walls as the first support plate is fed through the second constriction 44. Further, in examples, the walls may have poor wettability for the first fluid, meaning that first fluid from the channel 48 may not be deposited on the walls; any first fluid which might be applied to the walls is skimmed off the walls by the first fluid in the channel of first fluid, thus further aiding accurate dispensing of the first fluid on the display areas.

Figure 5:
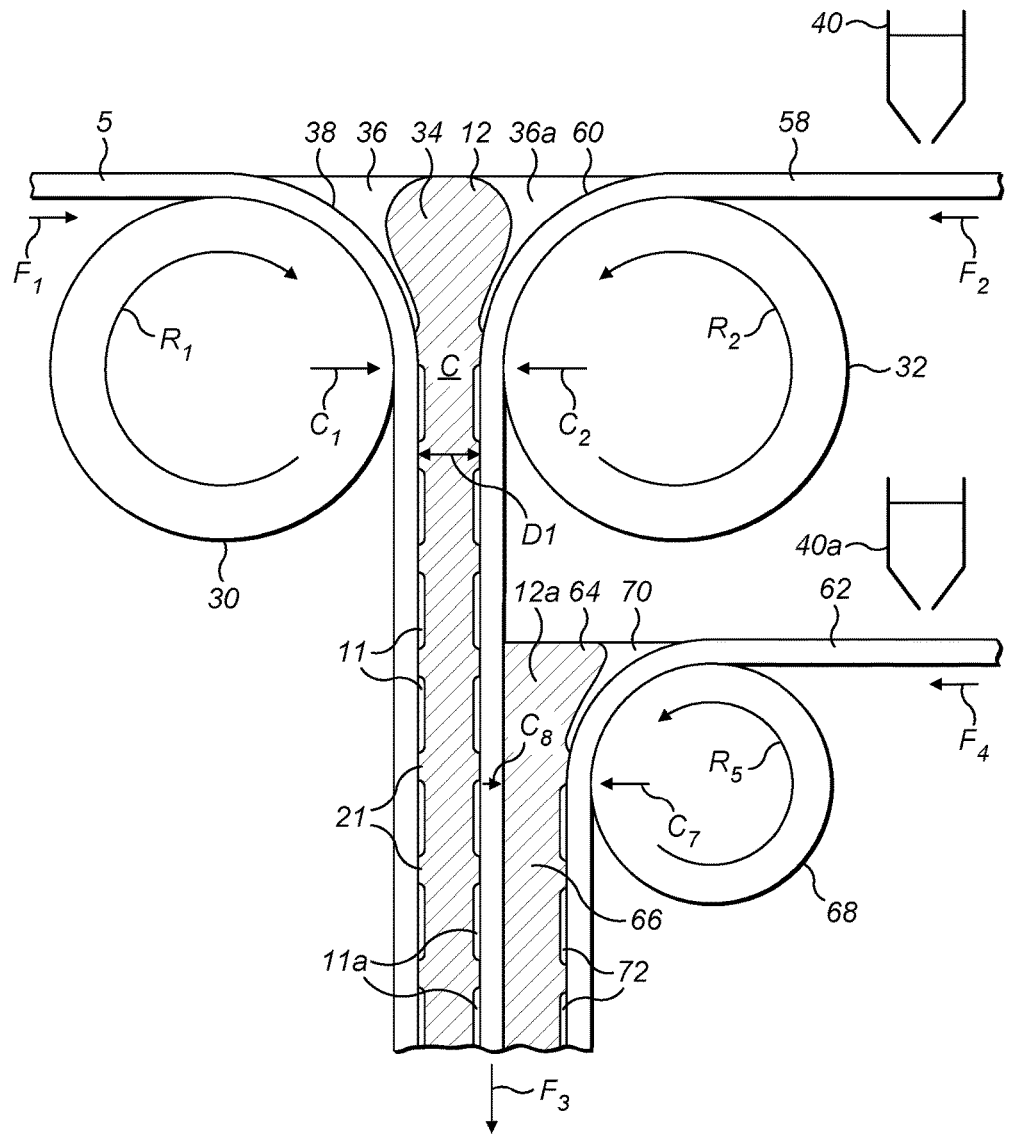

FIG. 5 illustrates schematically another example of part of a manufacturing method of an electrowetting display device. Features of the apparatus and their role in manufacturing the display device are similar to those described using FIG. 3 and are labelled in FIG. 5 using the same references numbers; corresponding descriptions apply. Differences in the example of FIG. 5 compared with that of FIG. 3 will therefore be described.

In this example of FIG. 5, further features are described which are different compared with the example of FIG. 3 but which have similarities to those described previously. Such features are labelled with the suffix "a" and take a similar description as given previously, but with differences now described.

In this example the second support plate 58 has a different construction than described previously and instead has in this example a similar construction to that of the first support plate. A further first fluid is provided in a further part of the cavity and within a further channel 36a formed between a part 60 of a surface of the second support plate and the second fluid 12. The further first fluid may have the same composition as the first fluid 11 described previously or may be different, for example coloured with a different dye than the first fluid dispensed on the surface of the first support plate using the channel 36. The further first fluid is dispensed on the part 60 of the surface of the second support plate by moving the second support plate towards the constriction C, as described previously, which moves the part 60 of the surface of the second support plate along a side of the further channel 60, for dispensing the further first fluid as regions 11a of the further first fluid on display areas of the second support plate.

In the example of FIG. 5 a further support plate 62 is provided, for example from a further support plate feeding system, as shown by arrow F4. The further support plate feeding system is configured to provide the further support plate angled relative to the second support plate to define, i.e. form, a further cavity 64 between the second support plate 58 and the further support plate 62. In this example the further support plate has a similar construction as the first support plate 5. The further cavity is formed between a surface of the second support plate 58 furthest away from the display area of the second support plate. The further cavity 64 narrows towards a further constriction 66, indicated between arrows C7 and C8, formed between the second support plate and the further support plate provided on a further roller 68 of the further support plate feeding system which roller is positioned for forming the further constriction. The further cavity 64 is at least partly filled with a further second fluid 12a which may be the same chemical composition as the second fluid 12 described previously or of a different composition. The further second fluid in the further cavity 64 therefore provides a further reservoir of the further second fluid for dispensing the further second fluid between the second support plate and the further support plate.

In this example the further support plate 62 is moved over a further element, in this example the further roller 68 which the further support plate is at least partly wrapped around. The further roller 68 functions in a similar way as the first roller, by moving the further support plate towards the further constriction 66 and towards the second support plate for dispensing the further second fluid at the second constriction, assisted by rotating R5 the further roller. In other examples, the second support plate may be moved towards the further support plate or both the second and further support plates may be moved towards each other.

A further first fluid 72, which may be the same or of a different composition than the first fluid described previously, is provided in part of the further cavity 64 and within a further channel 70. The further channel 70 is formed between a part of the surface of the further support plate and the further second fluid, although in other examples the further channel may be formed between the second fluid and a part of the surface of the second support plate. The further channel functions in a similar manner as the channel 36 described using FIG. 3 and that description should be taken to apply here, for dispensing the further first fluid by moving the appropriate one of the second support plate and the further support plate along a side of the further channel, to provide regions of the further first fluid 72 on display areas of the further support plate. A further first fluid supply system may be used for supplying the further first fluid in part of the further cavity to form and maintain the further channel of the further first fluid. A reservoir of the further second fluid in part of the further cavity may be formed and maintained using a further second fluid supply system (not illustrated) for supplying further second fluid into the further cavity. Further rollers may be used to assist supplying of the further first fluid as described similarly for supply of the first fluid using FIG. 4.

The second support plate and the further support plate are coupled together in this example in a similar way as coupling the first and second support plates described previously, using a further sealing material dispensing system 40a for dispensing a further sealing material on a surface of a part of the further support plate before reaching the further constriction during moving the second and further support plates towards the constriction, with the second and further support plates being coupled together by bringing the second and further support plates together, so the second support plate contacts the further sealing material; the previous description should be taken to apply here, modified accordingly.

Figure 6:
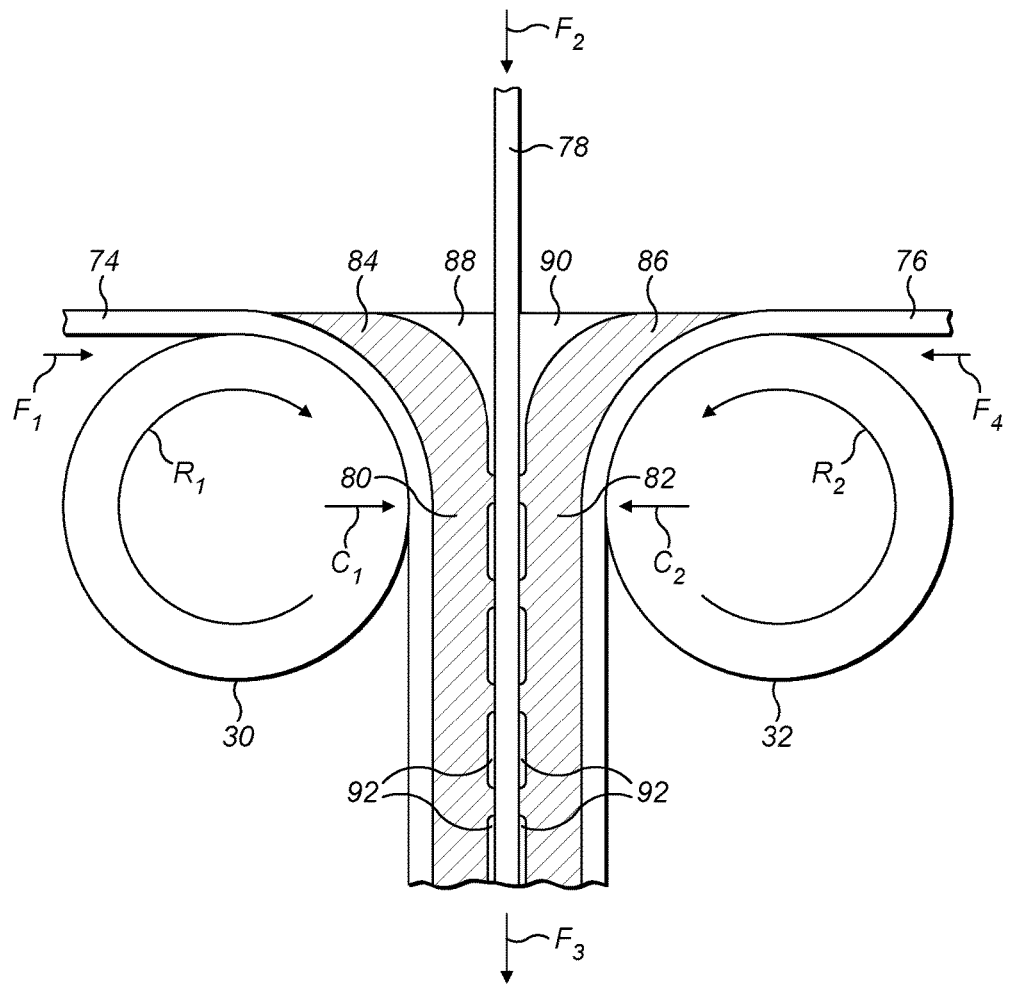

FIG. 6 illustrates schematically a different example of part of a manufacturing method of an electrowetting display device. Features of the apparatus and their role in manufacturing the display device are similar to those described using FIG. 3 and are labelled in FIG. 6 using the same reference numbers; corresponding descriptions apply. Differences in the example of FIG. 6 compared with that of FIG. 3 will therefore be described.

In this example, a first support plate 74 is fed F1 to and over the first roller 30, by wrapping the first support plate at least partly around the first roller. In this example the first support plate has a construction similar to the second support plate described using FIG. 3. A further support plate 76, also similar in construction to the second support plate of FIG. 3, is fed F4 from an appropriate feeding system. In this example the further support plate is fed to and over the second roller 32, by for example wrapping the further support plate at least partly around the second roller. A second support plate 78, which in this example is similar in construction to the first support plate 5 described using FIG. 3 but in this example may be comprised of a single substrate 7 with a stack of the electrode, barrier layer, hydrophobic layer and walls formed on two opposite and parallel surfaces of the substrate 7. The second support plate is fed F2 between the first and the further support plates 74, 76 using an appropriate feeding system. The first and second rollers 30, 32 are positioned separate from and relative to each other to form a constriction between the first and second rollers as indicated by arrows C1 and C2. However, in this example, in contrast with that of FIG. 3, the constriction includes two constrictions; a constriction 80 between the first and second support plates and a constriction 82, which may be referred to as a further constriction, between the second and further support plates.

The first support plate is angled relative to the second support plate and the further support plate is angled relative to the second support plate, to provide, respectively, a cavity 84 between the first support plate and the second support plate and a cavity 86 between the second support plate and the further support plate. These cavities are at least partly filled with a second fluid, which may be the same or different for each cavity 84, 86. In a similar manner as described previously, rotating the first and second rollers moves the first and further support plates over the first and second rollers respectively; also in this example by feeding the second support plate 78 appropriately, second fluid is dispensed by the constrictions 80, 82, respectively between the first and second support plates and between the second and further support plates, by moving at least one of the first and second support plates and at least one of the second and further support plates towards each other, to bring them together.

A channel 88, 90 of a first fluid is formed in each of the cavities 84, 86. The channels 88, 90 are each similar to the channel described previously using FIG. 3 except being formed respectively between the second fluid in each cavity and part of the second support plate. The first fluid is dispensed by moving the second support plate along the side of each channel 88, 90. The first fluid in each channel may be the same or different for each cavity 84, 86. With a similar first fluid dispensing method as described above, regions of first fluid 92 may be formed on display areas of the second support plate.

The above embodiments are to be understood as illustrative examples. The example of FIG. 5 is an example of manufacturing a display device with three layers of first fluid each for example coloured differently, whereas the example of FIG. 6 is an alternative method of manufacturing a display device with two layers of first fluid. It is to be appreciated that further types of display device may be manufactured using the principles described above, for example using a cavity between two support plates as a second fluid reservoir and for example using a channel of first fluid for dispensing the first fluid. In some such examples, a support plate may be used having a different construction than described above; for example, a support plate with a construction more similar to that of the first support plate described above with FIG. 1 may be used rather than the second support plate described with FIG. 1 and vice versa.

Figure 8:
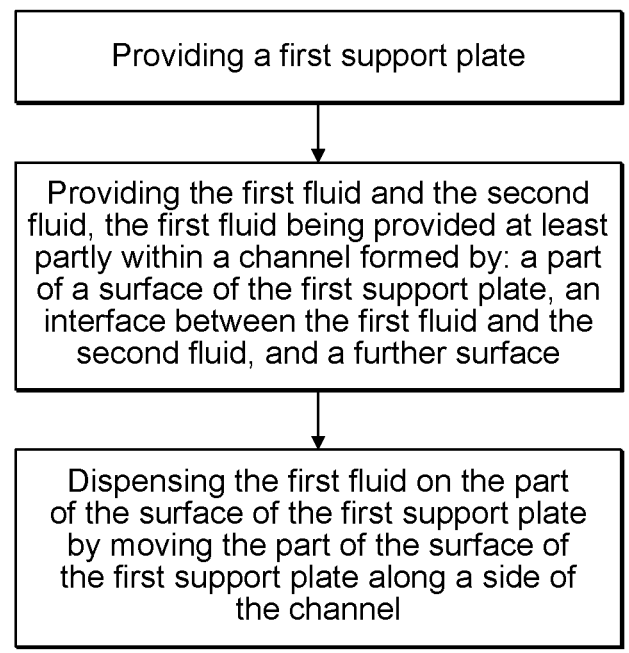

In the example described using FIG. 4, a third roller and a fourth roller are used as part of a process for dispensing the first fluid. It is envisaged that in further examples the use of at least a surface, such as of a roller, may be used in the manner of using the third roller and optionally the fourth roller to dispense a first fluid on a support plate of an electrowetting device; in some examples such a first fluid dispensing technique may be used without dispensing the second fluid in the manner described above. In other words, these methods of dispensing the first and second fluids may be used independently of each other, in further examples. Therefore, in further examples, with reference to FIG. 8, a method of manufacturing an electrowetting display device comprises: providing a first support plate; providing the first fluid and the second fluid, the first fluid being provided at least partly within a channel formed by: a part of a surface of the first support plate, an interface between the first fluid and the second fluid, and a further surface; the first fluid is dispensed on the part of the surface of the first support plate by moving the part of the surface of the first support plate along a side of the channel. In some such examples, the second fluid may be provided as a reservoir of second fluid contained by a container such as a bath, with the first support plate being immersed in the bath of second fluid, rather than the second fluid reservoir being provided in a cavity between the first and second support plates, as described in examples above. In some examples, the first support plate is provided such that the part of the surface of the first support plate and a horizontal plane forms an angle of one of: between 90 degrees and 170 degrees or between 135 and 160 degrees. In accordance with some such further examples, apparatus may be used which comprises a first support plate feeding system configured to provide the first support plate having a surface; a system for providing a reservoir of the second fluid; and a further surface for example as described above, for forming a channel within which the first fluid is at least partly provided. As explained in examples above, the channel may be formed by: a part of the surface of the first support plate, an interface between first fluid in the channel and the second fluid, and the further surface. The first support plate feeding system in such examples is further configured to move the part of the surface of the first support plate along a side of the channel, to dispense the first fluid on the part of the surface of the first support plate.

Examples described above relate to electrowetting display devices. Further examples are envisaged for manufacturing an electrowetting device which is not a display device.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An apparatus for manufacture of an electrowetting device comprising a first fluid and a second fluid, the apparatus comprising:
    a first support plate feeding system configured to provide a first support plate during the manufacture of the electrowetting device;
    a second support plate feeding system configured to provide a second support plate during the manufacture of the electrowetting device;
    the first support plate feeding system comprising a first element and the second support plate feeding system comprising a second element, the first element and the second element positioned relative to each other so as to angle the first support plate relative to the second support plate such that the first support plate and the second support plate are brought closer together as the first support plate and the second support plate are fed by the first element and the second element, respectively, so as to provide, during the manufacture of the electrowetting device, a cavity between the first support plate and the second support plate, and so as to space the first support plate with a distance from the second support plate to contain the first fluid and the second fluid in the electrowetting device;
    a first fluid supply system configured to supply the first fluid, during the manufacture of the electrowetting device, to the cavity; and
    a second fluid supply system configured to supply the second fluid, during the manufacture of the electrowetting device, to the cavity.

2. The apparatus of claim 1, wherein:
    the first fluid supply system is configured to supply the first fluid, during the manufacture of the electrowetting device, in a first part of the cavity; and
    the second fluid supply system is configured to supply the second fluid, during the manufacture of the electrowetting device, in a second part of the cavity different from the first part of the cavity.

3. The apparatus of claim 1, wherein the first fluid supply system is configured to supply, during the manufacture of the electrowetting device, the first fluid in at least one of:
    a first channel between:
        a first surface of the first support plate; and
        the second fluid; or
    a second channel between:
        a second surface of the second support plate; and
        the second fluid.

4. The apparatus of claim 1, wherein the first fluid supply system is configured to dispense, during the manufacture of the electrowetting device, the first fluid on at least one of: a first surface of the first support plate or a second surface of the second support plate.

5. The apparatus of claim 1, wherein the second fluid supply system is configured to provide, during the manufacture of the electrowetting device, a reservoir of the second fluid in the cavity.

6. The apparatus of claim 1, wherein:
    the first element comprises a first roller; and
    the second element comprises a second roller;
    the first roller rotatable to move, during the manufacture of the electrowetting device, the first support plate towards the second support plate and the second roller rotatable to move, during the manufacture of the electrowetting device, the second support plate towards the first support plate, to bring the first support plate and the second support plate closer together.

7. The apparatus of claim 6, wherein the first roller has a first diameter and the second roller has a second diameter, the first diameter smaller than the second diameter.

8. The apparatus of claim 1, wherein the first fluid supply system comprises a third element with a third element surface, the third element positioned such that, during the manufacture of the electrowetting device, there is:
    a third channel between: a first surface of the first support plate, a second fluid surface of the second fluid, and the third element surface.

9. The apparatus of claim 8, wherein the third element comprises a third roller rotatable, during the manufacture of the electrowetting device, to provide the first fluid in the third channel.

10. The apparatus of claim 9, wherein the first fluid supply system is configured to supply the first fluid between the third roller and a fourth roller.

11. The apparatus of claim 1, comprising a sealing material supply system configured to supply, during the manufacture of the electrowetting device, a sealing material onto a second surface of the second support plate.

12. The apparatus of claim 1, wherein:
    the first fluid is substantially electrically non-conductive; and
    the second fluid is at least one of electrically conductive or polar.

13. The apparatus of claim 1, comprising a third support plate feeding system configured to provide, during the manufacture of the electrowetting device, a third support plate angled relative to the second support plate such that the third support plate and the second support plate are brought closer together as the third support plate is fed by the third support plate feeding system, so as to provide a second cavity between the second support plate and the third support plate.

14. The apparatus of claim 13, wherein the third support plate feeding system comprises a fifth roller rotatable to move, during the manufacture of the electrowetting device, the third support plate towards the second support plate, to bring the second support plate and the third support plate closer together.

15. The apparatus of claim 13, comprising:
   a further first fluid supply system configured to supply a further first fluid during the manufacture of the electrowetting device; and
   a further second fluid supply system configured to supply a further second fluid during the manufacture of the electrowetting device.

16. The apparatus of claim 15, wherein:
   the further first fluid supply system is configured to supply the further first fluid, during the manufacture of the electrowetting device, in a further first part of the second cavity; and
   the further second fluid supply system is configured to supply the further second fluid, during the manufacture of the electrowetting device, in a further second part of the second cavity different from the further first part of the second cavity.

17. The apparatus of claim 13, comprising a further first fluid supply system configured to supply a further first fluid, during the manufacture of the electrowetting device, in at least one of:
   a further first channel between:
      a second surface of the second support plate; and
      a further second fluid; or
   a further second channel between:
      a third surface of the third support plate; and
      the further second fluid.

18. The apparatus of claim 13, comprising a further first fluid supply system configured to dispense, during the manufacture of the electrowetting device, a further first fluid on at least one of: a second surface of the second support plate or a third surface of the third support plate.

19. The apparatus of claim 13, comprising a further second fluid supply system configured to supply a further second fluid during the manufacture of the electrowetting device,
   the further second fluid supply system configured to provide, during the manufacture of the electrowetting device, a reservoir of the further second fluid between the second support plate and the third support plate.

20. The apparatus of claim 13, wherein the second support plate feeding system is configured to provide, during the manufacture of the electrowetting device, the second support plate at least partly between the first support plate and the third support plate.

* * * * *